(12) United States Patent
Kobori et al.

(10) Patent No.: US 9,014,654 B2
(45) Date of Patent: Apr. 21, 2015

(54) SEMICONDUCTOR APPARATUS

(71) Applicant: Murata Manufacturing Co., Ltd., Nagaokakyo-shi, Kyoto-fu (JP)

(72) Inventors: Tsutomu Kobori, Nagaokakyo (JP); Shigeki Koya, Nagaokakyo (JP); Akishige Nakajima, Nagaokakyo (JP); Yasushi Shigeno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 64 days.

(21) Appl. No.: 14/055,104

(22) Filed: Oct. 16, 2013

(65) Prior Publication Data
US 2014/0043110 A1    Feb. 13, 2014

Related U.S. Application Data

(63) Continuation of application No. PCT/JP2012/080489, filed on Nov. 26, 2012.

(30) Foreign Application Priority Data

Dec. 9, 2011 (JP) ................................. 2011-269729

(51) Int. Cl.
H04B 1/28 (2006.01)
H01P 1/15 (2006.01)
H04B 1/48 (2006.01)

(52) U.S. Cl.
CPC ... *H01P 1/15* (2013.01); *H04B 1/48* (2013.01)

(58) Field of Classification Search
CPC ........ H01P 1/15; H03K 17/693; H03K 17/76; H04B 1/48; H04B 1/38; H04B 1/30; H03B 7/125; H03D 7/1441
USPC .......... 455/75, 76, 77, 78, 118, 127.1, 127.2, 455/230, 232.1, 234.1, 313, 323, 333, 334, 455/550.1; 333/103

See application file for complete search history.

(56) References Cited

U.S. PATENT DOCUMENTS 7,269,392 B2 *  9/2007  Nakajima et al. ............... 455/83
7,738,841 B2 *  6/2010  Ahn et al. ...................... 455/78

(Continued)

FOREIGN PATENT DOCUMENTS

| | | | |
|---|---|---|---|
| JP | 62-98772 A | 5/1987 | |
| JP | 1-204383 A | 8/1989 | |

(Continued)

OTHER PUBLICATIONS

Official Communication issued in International Patent Application No. PCT/JP2012/080489, mailed on Jan. 29, 2013.

*Primary Examiner* — Nhan Le
(74) *Attorney, Agent, or Firm* — Keating & Bennett, LLP

(57) ABSTRACT

A semiconductor apparatus includes multiple field effect transistors provided between an antenna terminal to be connected to an antenna and multiple external terminals through which RF signals are capable of being supplied and a voltage generating circuit. When the field effect transistors provided between one of the multiple external terminals and the antenna terminal are turned off, the voltage generating unit charges a capacitor via a resistor circuit by switching the polarity of the RF signal to be supplied to the other external terminal with respect to the control signal and outputs a voltage based on a sum of the charge voltage and the voltage of the control signal as the gate drive voltage. The resistor circuit includes a first resistor including positive temperature characteristics and a second resistor including negative temperature characteristics.

19 Claims, 11 Drawing Sheets

(56) References Cited

U.S. PATENT DOCUMENTS

| | | | |
|---|---|---|---|
| 8,639,195 B2 * | 1/2014 | Christensen | 455/78 |
| 2006/0176084 A1 | 8/2006 | Suzuki et al. | |
| 2009/0137218 A1 | 5/2009 | Honda et al. | |
| 2010/0117713 A1 | 5/2010 | Katoh et al. | |
| 2010/0296220 A1 | 11/2010 | Seon | |
| 2013/0029614 A1 * | 1/2013 | Cho et al. | 455/83 |

FOREIGN PATENT DOCUMENTS

| | | |
|---|---|---|
| JP | 7-22515 A | 1/1995 |
| JP | 2006-190709 A | 7/2006 |
| JP | 2006-203418 A | 8/2006 |
| JP | 2007-243873 A | 9/2007 |
| JP | 2008-4833 A | 1/2008 |
| JP | 2009-135615 A | 6/2009 |
| JP | 2010-50769 A | 3/2010 |
| JP | 2010-114837 A | 5/2010 |
| JP | 2010-114937 A | 5/2010 |
| JP | 2010-272523 A | 12/2010 |

* cited by examiner

SEMICONDUCTOR APPARATUS

BACKGROUND OF THE INVENTION

1. Field of the Invention

The present invention relates to a semiconductor apparatus including an antenna switch for a wireless communication system. In particular, the present invention relates to an effective technology to significantly reduce or prevent deterioration in characteristics caused by temperature fluctuation in the antenna switch.

2. Description of the Related Art

A typical mobile terminal, such as a cellular phone, for wireless communication uses an antenna switch for switching a signal path connected to one antenna between the transmission side and the reception side. In the antenna switch used in the mobile terminal, a high-frequency switch in an on state is required to have low insertion loss while a high-frequency switch in an off state is required to have high isolation characteristics and low distortion characteristics. Many antenna switches using high electron mobility transistors (HEMTs) that have a hetero junction structure and that have low on resistance as switch elements have been put into production in recent years as antenna switches having low insertion loss. A technology to improve the isolation characteristics of a field effect transistor in the off state in an antenna switch using the field effect transistor, such as the HEMI, is disclosed in Japanese Unexamined Patent Application Publication No. 2010-114837.

Japanese Unexamined Patent Application Publication No. 2010-114837 discloses an antenna switch in which, in transmission of a radio-frequency (RF) transmission signal, a voltage step-up circuit generates a positive voltage higher than direct current (DC) control voltage on the basis of the DC control voltage and the RF transmission signal and the generated positive voltage is used as a gate control voltage of a transmission-side field effect transistor (an n channel HEMT). With this antenna switch, the on resistance of the transmission-side field effect transistor in the transmission is decreased to reduce the insertion loss, and the voltage at the source side of a reception-side field effect transistor is increased via the gate of the transmission-side field effect transistor to strengthen a reverse bias state of the reception-side field effect transistor in order to improve the isolation characteristics.

In addition, Japanese Unexamined Patent Application Publication No. 2010-114837 discloses an antenna switch in which, in the transmission of the RF transmission signal, a voltage step-down circuit generates negative voltage lower than the DC control voltage on the basis of the DC control voltage and the RF transmission signal and the generated negative voltage is used as the gate control voltage of the reception-side field effect transistor (an n channel HEMT) to put a gate Schottky barrier of the reception-side field effect transistor in the reverse bias state. With this antenna switch, the reverse bias state of the reception-side field effect transistor is strengthened to improve the isolation characteristics, as in the voltage step-up circuit described above.

The voltage step-up circuit and the voltage step-down circuit charge capacitors by using switching of the polarity of the transmission signal, like a charge pump circuit, to generate the positive voltage higher than the DC control voltage and the negative voltage lower than the DC control voltage, respectively. In the circuit that generates the positive voltage or the negative voltage according to the above principle, the time to cause the output voltage to have a desired value is mainly determined by the charging time of the capacitor.

Accordingly, for example, if the charging time of the capacitor in the voltage step-down circuit is long in the antenna switch including the voltage step-down circuit described in Japanese Unexamined Patent Application Publication No. 2010-114837, it takes a long time to put the reception-side field effect transistor in a sufficient off state (the reverse bias state) in the transmission of the RF transmission signal to form a leakage path of the RF transmission signal at the reception side, thereby possibly deteriorating the characteristics of harmonic distortion in the RF transmission.

The charging time of the capacitor is mainly determined by the time constant of the capacitor to be charged and the resistor existing on the charge path. For example, in the voltage step-down circuit illustrated in FIG. 1 in Japanese Unexamined Patent Application Publication No. 2010-114837, the charging time is mainly determined by the time constant of a capacitor 110 and a resistor 107. In order to shorten the charging time of the capacitor, it is necessary to decrease the resistance value of the resistor existing on the charge path as much as possible. However, since the resistor has a role in limiting the amount of current flowing through the capacitor so as not to exceed an allowable value, it is not possible to cause the resistor to have an extremely low resistance value. Accordingly, in designing the circuit, it is necessary to determine the resistance value so as to shorten the charging time while limiting the amount of current flowing through the capacitor so as not to exceed the allowable value. However, since the resistor formed on a semiconductor substrate has positive temperature characteristics or negative temperature characteristics, the resistance value is increased at low temperature or high temperature even if the resistance value is determined so that the charging time of the capacitor is set to an appropriate time at normal temperature to increase the charging time. For example, provided that the gate voltage of the reception-side field effect transistor is made, for example, −2.0 V when a certain time elapsed after the transmission signal rises at normal temperature, the gate voltage of the reception-side field effect transistor is only made −1.0 V at high temperature even if the same time elapsed and it takes a longer time to make the gate voltage of the reception-side field effect transistor −2.0 V. Accordingly, even when no problem occurs at normal temperature, the leakage path of the RF transmission signal may be formed at the reception side immediately after the RF transmission signal rises to possibly cause the harmonic distortion of the RF transmission signal at high temperature or low temperature.

The communication quality of the mobile terminals is required to be further improved in recent years and the antenna switches used in the mobile terminals are also required to realize high specifications. Accordingly, the inventor has considered that it is not possible to ignore deterioration in characteristics caused by temperature fluctuation in the antenna switches.

SUMMARY OF THE INVENTION

Preferred embodiments of the present invention prevent deterioration in characteristics of an antenna switch due to temperature fluctuations.

A semiconductor apparatus according to a preferred embodiment of the present invention includes multiple field effect transistors provided between an antenna terminal for connection to an antenna and multiple external terminals through which RF signals are capable of being supplied and a voltage generating unit. When the field effect transistor provided between one of the multiple external terminals and the antenna terminal is turned off, the voltage generating unit charges a capacitor via a resistor circuit by switching of the polarity of the RF signal to be supplied to another external terminal with respect to a control signal and outputs a voltage based on a sum of the charge voltage and the voltage of the control signal as a gate drive voltage. The resistor circuit includes a first resistor having positive temperature characteristics and a second resistor having negative temperature characteristics.

According to various preferred embodiments of the present invention, it is possible to prevent deterioration in characteristics of the antenna switch due to temperature fluctuation.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
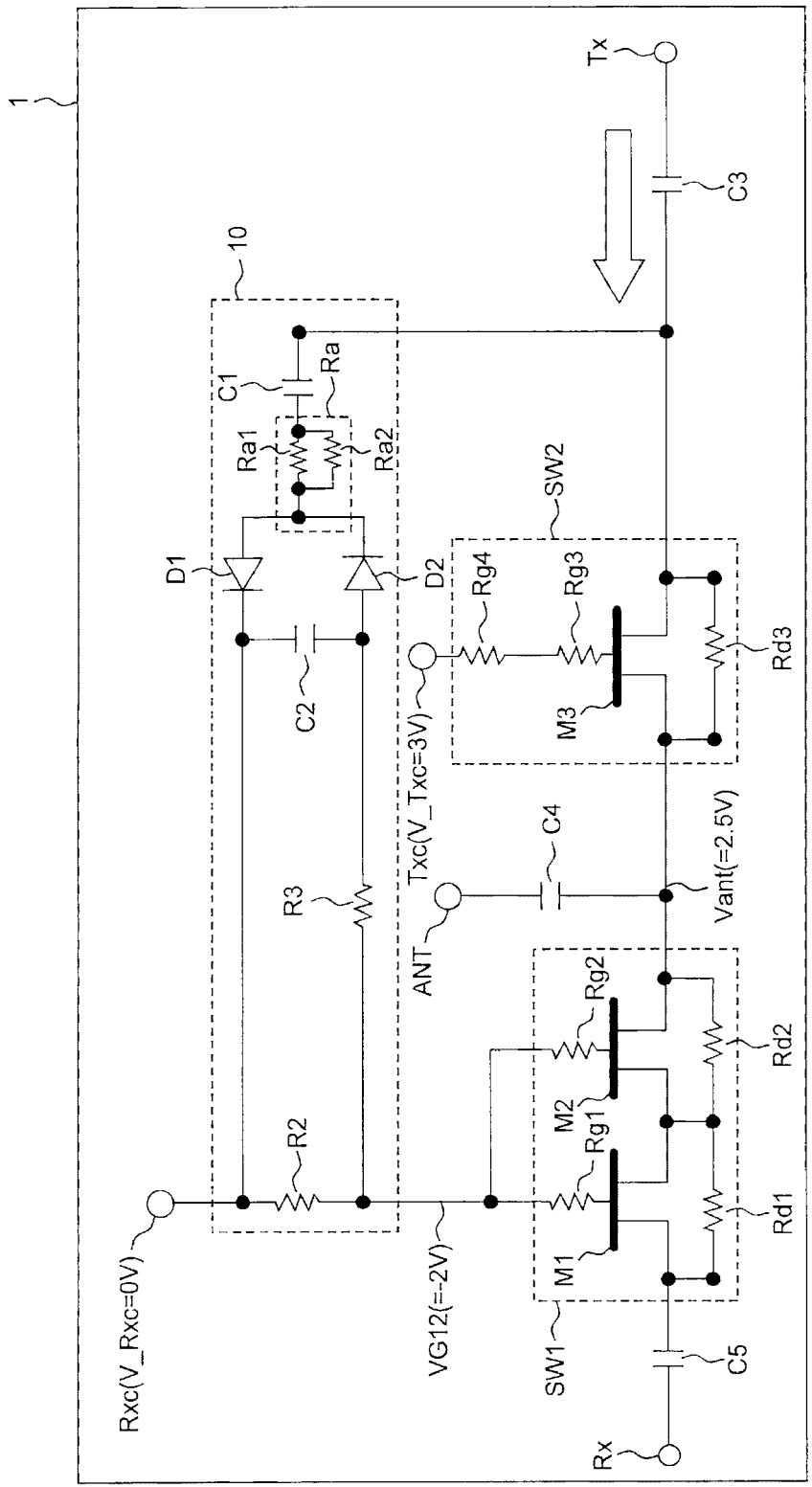
FIG. 1 is a circuit diagram illustrating the configuration of an antenna switch according to a first preferred embodiment of the present invention.

Exemplary preferred embodiments of the present invention will now be described. Reference numerals and letters in the drawings to which parentheses are added are only referred to as exemplary components included in the concept of the components to which the reference numerals and letters are added in the description of the exemplary preferred embodiments of the present invention.

A semiconductor apparatus (1) according to a preferred embodiment of the present invention includes an antenna terminal (ANT) for connection to an antenna; multiple external terminals (Rx, Tx) through which RF signals are capable of being supplied; multiple field effect transistors (M1 to M3) provided between the antenna terminal and the respective external terminals; and control terminals (Txc, Rxc) through which control signals that control turning on and off of the respective field effect transistors are received. The semiconductor apparatus also includes a voltage generating unit (10) that generates a gate drive voltage of the field effect transistors (M1, M2) provided between one (Rx) of the plurality of external terminals and the antenna terminal. When the field effect transistors (M1, M2) provided between the one external terminal and the antenna terminal are turned off, the voltage generating unit charges a capacitor (C2) via a resistor circuit (Ra) by using switching of the polarity of the RF signal (RF transmission signal) to be supplied to the other external terminal (Tx) with respect to the control signal and outputs a voltage based on the sum of the charge voltage and a voltage (V_Rxc) of the control signal as the gate drive voltage. The resistor circuit includes a first resistor (Ra1) having positive temperature characteristics and a second resistor (Ra2) having negative temperature characteristics.

With the semiconductor apparatus described above, it is possible to reduce the temperature fluctuation in the time required for the field effect transistor to be turned off to move to a deep reverse bias state because of the low temperature dependence of the resistor circuit, which determines the charging time of the capacitor. Accordingly, it is possible to prevent the leak path of the RF signal passing through the field effect transistor in the off state from being formed immediately after the switching between the signal transmission and the signal reception, for example, in a low temperature state or a high temperature state to prevent deterioration in characteristics of harmonic distortion.

In the semiconductor apparatus described above, the first resistor includes a semiconductor layer (a channel layer 604 or a cap layer 606) formed on a semiconductor substrate by epitaxial growth, and the second resistor includes a metal layer (702 (WSiN or Ta—$SiO_2$)).

With the above semiconductor apparatus, it is possible to easily reduce or prevent the temperature fluctuation in the resistance value of the resistor circuit.

In the semiconductor apparatus described above, the first resistor is arranged so as to vertically oppose the second resistor with an insulating layer (706) for insulation between the semiconductor layers sandwiched between the first resistor and the second resistor.

With the above semiconductor apparatus, it is possible to reduce the chip area, compared with the case in which the first resistor and the second resistor are laid out side by side on the semiconductor substrate.

In the semiconductor apparatus described above, the semiconductor substrate preferably is made of compound semiconductor (GaAs), for example. The semiconductor layer formed on the semiconductor substrate by the epitaxial growth is a channel layer (604). The metal layer preferably is made of WSiN or Ta—$SiO_2$, for example.

Since the absolute value of the temperature coefficient of the channel layer formed on, for example, the compound semiconductor (GaAs) has the same or substantially the same value as that of the temperature coefficient of the metal layer, it is possible to further reduce the temperature fluctuation in the resistance value of the resistor circuit with the semiconductor apparatus described above.

In the semiconductor apparatus described above, the one external terminal is a reception terminal (Rx) through which an RF signal is to be received and the other external terminal is a transmission terminal (Tx) through which an RF signal is to be transmitted.

A semiconductor apparatus according to another preferred embodiment of the present invention includes an antenna terminal (ANT) for connection to an antenna; multiple external terminals (Rx, Tx) through which RF signals are capable of being supplied; multiple field effect transistors (M1 to M3) provided between the antenna terminal and the respective external terminals; and control terminals (Rxc, Txc) through which control signals to control turning on and off of the respective field effect transistors are received. The semiconductor apparatus also includes a voltage generating unit (20) that generates a gate drive voltage of the field effect transistor (M3) provided between one (Tx) of the plurality of external terminals and the antenna terminal. When the field effect transistor (M3) provided between the one external terminal and the antenna terminal is turned on, the voltage generating unit charges a capacitor (C12) via a resistor circuit (Rb) by using switching of the polarity of the RF signal (RF transmission signal) to be supplied to the one external terminal with respect to the control signal and outputs a voltage based on the sum of the charge voltage and the voltage of the control signal as the gate drive voltage. The resistor circuit includes a first resistor (Rb1) having positive temperature characteristics and a second resistor (Rb2) having negative temperature characteristics.

With the semiconductor apparatus described above, it is possible to reduce the temperature fluctuation in the time required for the field effect transistor to be turned on to move to a deep forward bias state because of the low temperature dependence of the resistor circuit, which determines the charging time of the capacitor. In addition, since the source voltage of another field effect transistor (for example, the field effect transistor in the off state) connected via the antenna terminal is also varied in accordance with the gate voltage of the field effect transistor to be turned on, it is also possible to reduce the temperature fluctuation in the time required for the gate and the source of the other field effect transistor to move to a deep reverse bias state. Accordingly, it is possible to prevent the leak path of the RF signal passing through the field effect transistor in the off state from being formed immediately after the switching between the signal transmission and the signal reception, for example, in a low temperature state or a high temperature state to prevent the deterioration in the harmonic distortion.

In the semiconductor apparatus described above, the first resistor includes a semiconductor layer (a channel layer 604 or a cap layer 606) formed on a semiconductor substrate by epitaxial growth, and the second resistor includes a metal layer (702 (WSiN or Ta—SiO$_2$)).

With the above semiconductor apparatus, it is possible to easily reduce or prevent temperature fluctuation in the resistance value of the resistor circuit in the semiconductor apparatus.

In the semiconductor apparatus described above, the first resistor is arranged so as to vertically oppose the second resistor with an insulating layer (706) for insulation between the semiconductor layers sandwiched between the first resistor and the second resistor.

With the above semiconductor apparatus, it is possible to reduce the chip area, compared with the case in which the first resistor and the second resistor are laid out side by side on the semiconductor substrate.

In the semiconductor apparatus described above, the semiconductor substrate is preferably made of a compound semiconductor (GaAs), for example. The semiconductor layer formed on the semiconductor substrate by the epitaxial growth is a channel layer (604). The metal layer is made of WSiN or Ta—SiO$_2$.

Since the absolute value of the temperature coefficient of the channel layer formed on, for example, the compound semiconductor (GaAs) has the same or substantially the same value as that of the temperature coefficient of the metal layer, it is possible to further reduce or prevent the temperature fluctuation in the resistance value of the resistor circuit with the semiconductor apparatus described above.

In the semiconductor apparatus described above, the one external terminal preferably is a transmission terminal (Tx) through which an RF signal is to be transmitted.

A semiconductor apparatus (1, 2) according to another preferred embodiment of the present invention includes an antenna terminal (ANT) for connection to an antenna; multiple external terminals (Rx, Tx) through which RF signals are capable of being supplied; multiple field effect transistors (M1 to M3) provided between the antenna terminal and the respective external terminals; and control terminals (Txc, Rxc) through which control signals to control turning on and off of the respective field effect transistors are received. The semiconductor apparatus also includes a voltage generating unit (10, 20) that generates a gate drive voltage of the field effect transistors (M1 and M2 or M3) provided between one (Rx or Tx) of the plurality of external terminals and the antenna terminal. The voltage generating unit charges a capacitor (C2, C12) via a resistor circuit (Ra, Rb) by switching the polarity of a transmission signal (RF transmission signal) to be supplied to a source or a drain of the field effect transistor (M3) that is in an on state with respect to the control signal and outputs a voltage based on the sum of the charge voltage and the voltage of the control signal as the gate drive voltage. The resistor circuit includes a first resistor (Ra1, Rb1) having positive temperature characteristics and a second resistor (Ra2, Rb2) having negative temperature characteristics.

With the above semiconductor apparatus, since the temperature fluctuation in the charging time of the capacitor is reduced, it is possible to reduce or prevent the temperature fluctuation in the time required for the gate drive voltage of the field effect transistor provided between the one external terminal and the antenna terminal to reach a target voltage. Accordingly, it is possible to reduce the temperature dependence of the time required for the field effect transistor to move to a target bias state to prevent the deterioration in the characteristics of the antenna switch caused by the variation in the bias state of the field effect transistor involved in the temperature fluctuation.

In the semiconductor apparatus described above, the one external terminal preferably is a reception terminal (Rx) through which a reception signal is capable of being supplied.

With the semiconductor apparatus described above, it is possible to significantly reduce or prevent the temperature fluctuation in the time required for the gate and the source of the field effect transistor at the reception side to move to a deep reverse bias state. Accordingly, it is possible to prevent the leak path of the RF signal passing through the field effect transistor at the reception side in the off state from being formed immediately after the switching between the signal transmission and the signal reception, for example, in a low temperature state or a high temperature state to prevent the deterioration in the characteristics of the harmonic distortion.

In the semiconductor apparatus described above, the one external terminal is a transmission terminal (Tx) through which a transmission signal is capable of being supplied.

With the semiconductor apparatus described above, it is possible to significantly reduce or prevent the temperature fluctuation in the time required for the gate and the source of another field effect transistor (for example, the field effect transistor at the reception side in the off state) to move to a deep reverse bias state via the gate of the field effect transistor at the transmission side. Accordingly, it is possible to prevent the leak path of the RF signal passing through the field effect transistor at the reception side in the off state from being formed immediately after the switching between the signal transmission and the signal reception, for example, in a low temperature state or a high temperature state to prevent the deterioration in the characteristics of the harmonic distortion.

Preferred embodiments will herein be described in detail.

First Preferred Embodiment

FIG. 1 is a circuit diagram illustrating the configuration of an antenna switch according to a first preferred embodiment of the present invention.

Referring to FIG. 1, an antenna switch 1 preferably is a single pole double throw (SPDT) antenna switch and establishes a signal path of RF signals in, for example, a Global System for Mobile Communications (GSM) (registered trademark) mode between the transmission side and the reception side. The antenna switch 1 preferably is located on one compound semiconductor substrate that is made of gallium arsenide (GaAs) or the like and that has high electron mobility although not specifically restricted. Specifically, the antenna switch 1 includes a reception-side high-frequency switch SW1, a transmission-side high-frequency switch SW2, and a voltage generating circuit 10.

The reception-side high-frequency switch SW1 performs switching between connection and disconnection between an antenna terminal ANT used to connect to an antenna and a reception terminal Rx to which an RF reception signal is to be supplied in accordance with control voltage V_Rxc supplied to a control terminal Rxc. The high-frequency switch SW1 includes two field effect transistors M1 and M2 of a multi-gate structure. The field effect transistors M1 and M2 are, for example, negative channel HEMTs and are connected in series to each other. The use of the HEMTs of the multi-gate structure allows the voltage capable of being processed by the high-frequency switch SW1 to be increased and allows low on resistance to be ensured so that the loss in the field effect transistors M1 and M2 is decreased. A resistor Rd1 having a relatively high resistance value (for example, several tens kilo-ohms) is connected between the drain and the source of the field effect transistor M1 and a resistor Rd2 having a relatively high resistance value (for example, several tens kilo-ohms) is connected between the drain and the source of the field effect transistor M2. Accordingly, it is possible to make the drain voltage equal to the source voltage when the field effect transistors M1 and M2 are turned off. The gate of the field effect transistor M1 is connected to a resistor R2 in the voltage generating circuit 10 via a gate resistor Rg1 connected to the gate of the field effect transistor M1, and the gate of the field effect transistor M2 is connected to the resistor R2 in the voltage generating circuit 10 via a gate resistor Rg2 connected to the gate of the field effect transistor M2. Making the resistance values of the gate resistors Rg1 and Rg2 relatively high allows the loss caused by leakage of the RF signal into the control terminal Rxc to be reduced.

The high-frequency switch SW2 performs switching between connection and disconnection between the antenna terminal ANT and a transmission terminal Tx to which an RF transmission signal is to be supplied in accordance with control voltage V_Txc supplied to a control terminal Txc. The high-frequency switch SW2 includes a field effect transistor M3 including, for example, one negative channel HEMT. A resistor Rd3 having a relatively high resistance value (for example, several tens kilo-ohms) is connected between the drain and the source of the field effect transistor M3, as in the high-frequency switch SW1. In addition, the gate of the field effect transistor M3 is connected to the control terminal Txc via gate resistors Rg3 and Rg4. Making the resistance values of the gate resistors Rg3 and Rg4 relatively high allows the loss caused by leakage of the RF signal into the control terminal Txc to be reduced.

A capacitor C3 is provided between the transmission terminal Tx and the field effect transistor M3, a capacitor C4 is provided between a node to which the field effect transistors M2 and M3 are connected and the antenna terminal ANT, and a capacitor C5 is provided between the reception terminal Rx and the field effect transistor M1. Each of the capacitors C3 to C5 has a DC cutting function that prevents DC voltage from being applied to an external terminal (the antenna terminal, the reception terminal, or the transmission terminal) connected to one end of the corresponding capacitor and an alternating current (AC) coupling function that transmits the RF signal.

The voltage generating circuit 10 is a voltage step-down circuit that generates negative voltage on the basis of the RF transmission signal to be supplied to the transmission terminal Tx and the control voltage V_Rxc supplied to the control terminal Rxc to supply the negative voltage to the reception-side high-frequency switch SW1. Specifically, the voltage generating circuit 10 includes capacitors C1 and C2, diodes D1 and D2, a resistor circuit Ra, and resistors R2 and R3. The following connection relationship is established between the capacitors C1 and C2, the diodes D1 and D2, the resistor circuit Ra, and the resistors R2 and R3. One end of the capacitor C1 is connected to a node to which the drain of the field effect transistor M3 and the capacitor C3 are connected and the other end thereof is connected to the resistor circuit Ra. One end of the resistor circuit Ra is connected to the capacitor C1 and the other end thereof is connected an anode of the diode D1 and a cathode of the diode D2. A cathode of the diode D1 is connected to one end of the capacitor C2 and an anode of the diode D2 is connected to the other end of the capacitor C2. The one end of the capacitor C2 and the cathode of the diode D1 are connected to the control terminal Rxc. One end of the resistor R2 is connected to the control terminal Rxc and the other end thereof is connected to one end of the resistor R3, the gate resistor Rg1 of the field effect transistor M1, and the gate resistor Rg2 of the field effect transistor M2. The other end of the resistor R3 is connected to the other end of the capacitor C2 and the anode side of the diode D2.

A case will now be considered in which, for example, 0 V is supplied to the control terminal Rxc as the control voltage V_Rxc and, for example, 3 V is supplied to the control terminal Txc as the control voltage V_Txc in order to switch the antenna switch 1 to a transmission mode. In this case, the field effect transistor M3 at the transmission side is in an on state and a source voltage (the voltage at the antenna terminal side) Vant of the field effect transistor M3 is increased in accordance with the gate voltage to have a value of, for example, about 2.5 V. The gate and the source of the field effect transistor M1 at the reception side and the gate and the source of the field effect transistor M2 at the reception side are reverse biased to cause the field effect transistors M1 and M2 to be in an off state. Upon supply of the RF transmission signal to the transmission terminal Tx in this state, the RF transmission signal is propagated to the antenna terminal ANT through the high-frequency switch SW2. A portion of the RF transmission signal is supplied to the voltage generating circuit 10.

For example, when the RF transmission signal has a voltage width/height (a positive voltage width/height) higher than the control voltage V_Rxc, the diode D2 is reverse-biased to be in a non-conductive state and the diode D1 is forward-biased to be in a conductive state. As a result, current flows from the transmission terminal Tx side into the control terminal Rxc through the capacitor C1, the resistor circuit Ra, and the diode D1 to cause negative electric charge to be accumulated in an electrode at the resistor circuit Ra side of the capacitor C1. When the RF transmission signal has a voltage width/height (a negative voltage width/height) lower than the control voltage V_Rxc, the diode D1 is reverse-biased to be in the non-conductive state and the diode D2 is forward-biased to be in the conductive state. As a result, current flows from the control terminal Rxc into the transmission terminal Tx side through the capacitor C2, the diode D2, the resistor circuit Ra, and the capacitor C1 to cause the negative electric charge accumulated in the electrode at the resistor circuit Ra side of the capacitor C1 to be moved to and accumulated in an electrode at the diode D2 side of the capacitor C2. The movement of the electric charge between the capacitor C1 and the capacitor C2 by using the alternate switching of the polarity of the RF transmission signal with respect to the control voltage V_Rxc (=0 V) in the above manner causes voltage (for example, −2.0 V) to be charged between both terminals of the capacitor C2. The voltage has negative polarity at the electrode at the diode D2 side. This negative voltage is supplied as a gate voltage VG12 of the field effect transistors M1 and M2 at the reception side to cause a deep reverse bias state between the gates and the sources of the field effect transistors M1 and M2 at the reception side, so as to improve the isolation characteristics of the reception-side high-frequency switch SW1.

The resistor circuit Ra has a circuit configuration in which, for example, two resistors Ra1 and Ra2 are connected in parallel to each other. The resistor Ra1 and the resistor Ra2 will now be described in detail.

The resistors preferably including a channel layer, a cap layer, and a metal layer located on a semiconductor substrate made of the compound semiconductor GaAs and preferably formed by, for example, metalorganic chemical vapor deposition (MOCVD) or molecular beam epitaxy (MBE), may preferably be used as the resistors in the antenna switch 1. The resistor including the channel layer is hereinafter referred to as a channel resistor, the resistor using the cap layer ($n^+$ layer) is hereinafter referred to as an $n^+$ resistor, and the resistor including the metal layer is hereinafter referred to as a metal resistor.

Figure 2:
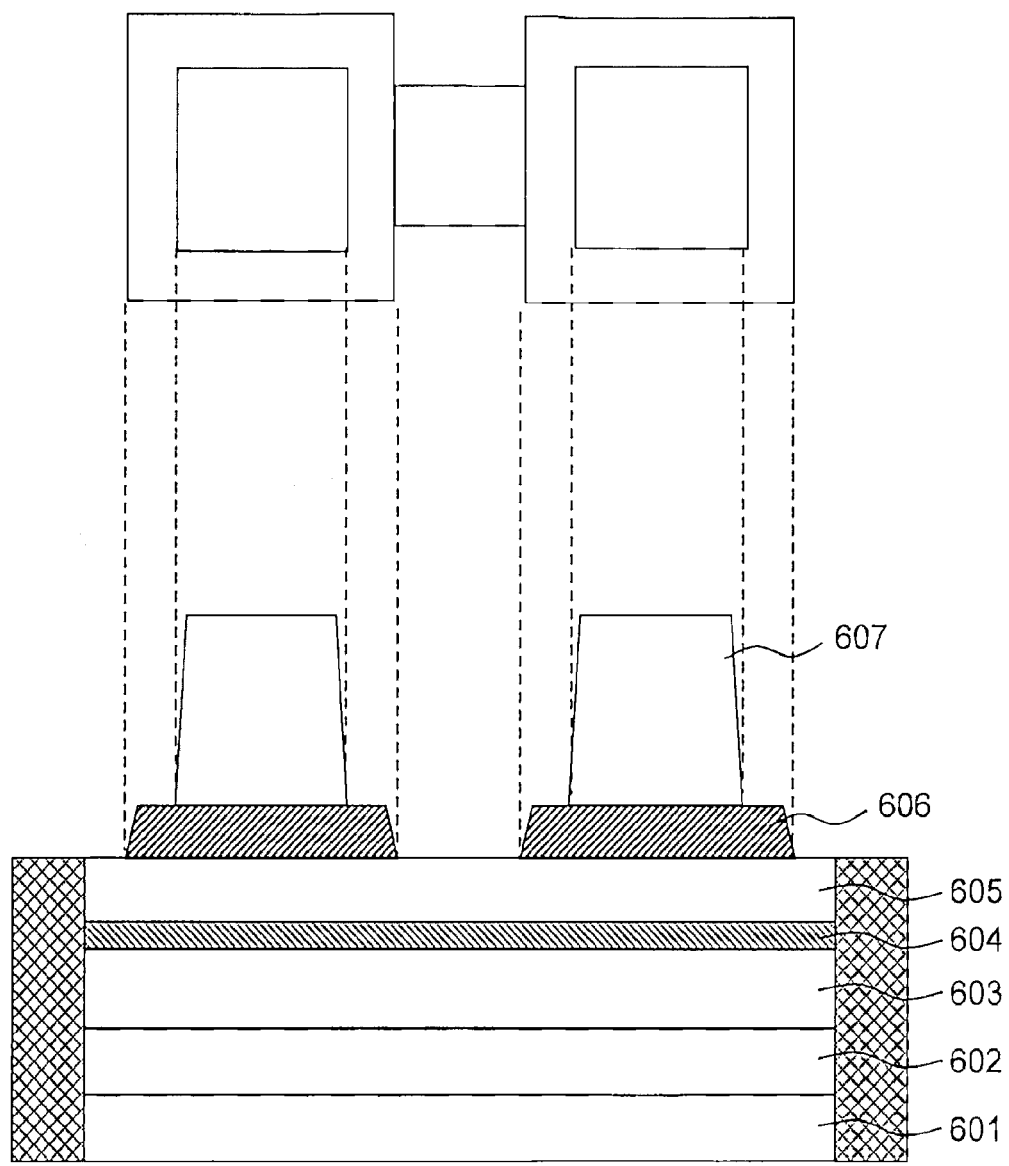
FIG. 2 is a descriptive diagram illustrating an exemplary cross-sectional structure of a channel resistor.

FIG. 2 is a descriptive diagram illustrating an exemplary cross-sectional structure of the channel resistor. As illustrated in FIG. 2, a buffer layer 602, an electron supply layer 603, a channel layer 604, an electron supply layer 605, a cap layer ($n^+$ layer) 606, electrodes 607 including an ohmic layer are sequentially epitaxially grown by, for example, MOCVD or MBE on a semiconductor substrate 601 made of the compound semiconductor GaAs. The channel resistor is a resistor including the channel layer 604 as the main resistance component and has the positive temperature characteristics.

Figure 3:
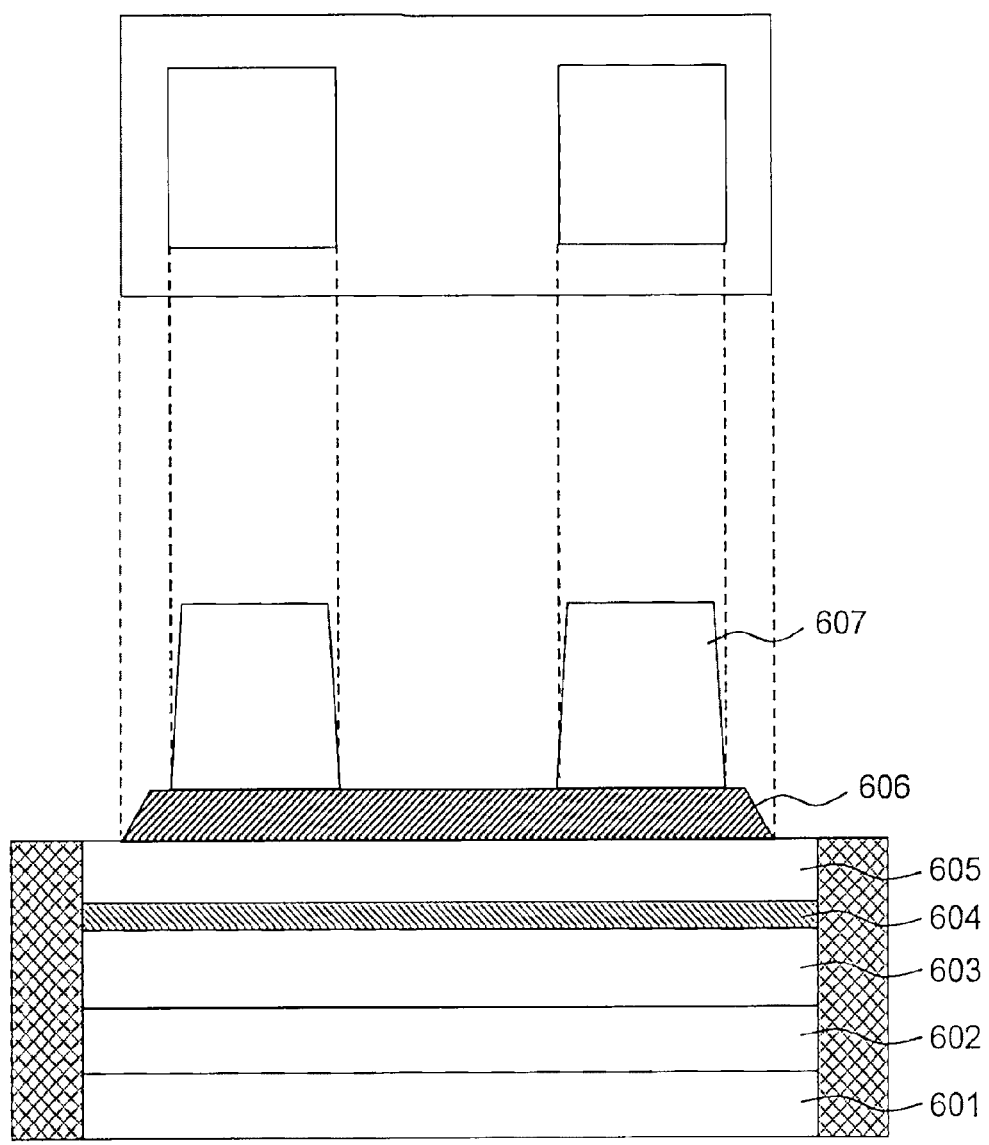
FIG. 3 is a descriptive diagram illustrating an exemplary cross-sectional structure of an $n^+$ resistor.

FIG. 3 is a descriptive diagram illustrating an exemplary cross-sectional structure of the $n^+$ resistor. As in the example in FIG. 2, the buffer layer 602, the electron supply layer 603, the channel layer 604, the electron supply layer 605, the cap layer ($n^+$ layer) 606, the electrodes 607 including the ohmic layer are sequentially epitaxially grown on the semiconductor substrate 601. The $n^+$ resistor includes the cap layer ($n^+$ layer) 606 as the main resistance component. The cap layer 606 preferably includes an $n^+$ type GaAs layer and is doped with an n-type conductive impurity ion (for example, silicon ion). The resistivity per unit area of the $n^+$ resistor is lower than that of the channel resistor. Accordingly, when the resistor of a certain resistance value is realized by the $n^+$ resistor, the layout area of the $n^+$ resistor is generally larger than that of the channel resistor. In addition, the $n^+$ resistor has the positive temperature characteristics and the temperature coefficient of the $n^+$ resistor is lower than that of the channel resistor.

Figure 4:
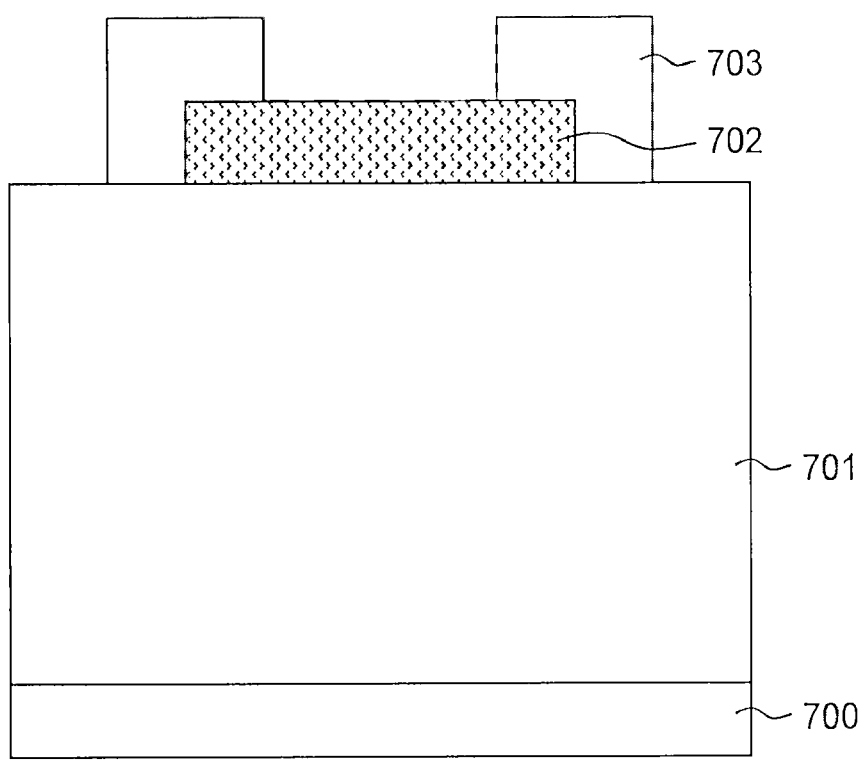
FIG. 4 is a descriptive diagram illustrating an example of a metal resistor.

FIG. 4 is a descriptive diagram illustrating an example of the metal resistor. As illustrated in FIG. 4, an insulating layer (also referred to as a device isolation implantation area) 701 is formed preferably by performing ion implantation to the semiconductor layers that are epitaxially grown on a semiconductor substrate 700 by MOCVD or MBE. A metal layer 702 and electrodes 703 are sequentially formed on the insulating layer 701. The electrodes 703 are preferably made of, for example, Au. The metal layer 702 preferably is made of, for example, WSiN or Ta—$SiO_2$. The metal resistor is a resistor including the metal layer 702 as the main resistance component and has the negative temperature characteristics.

Figure 5:
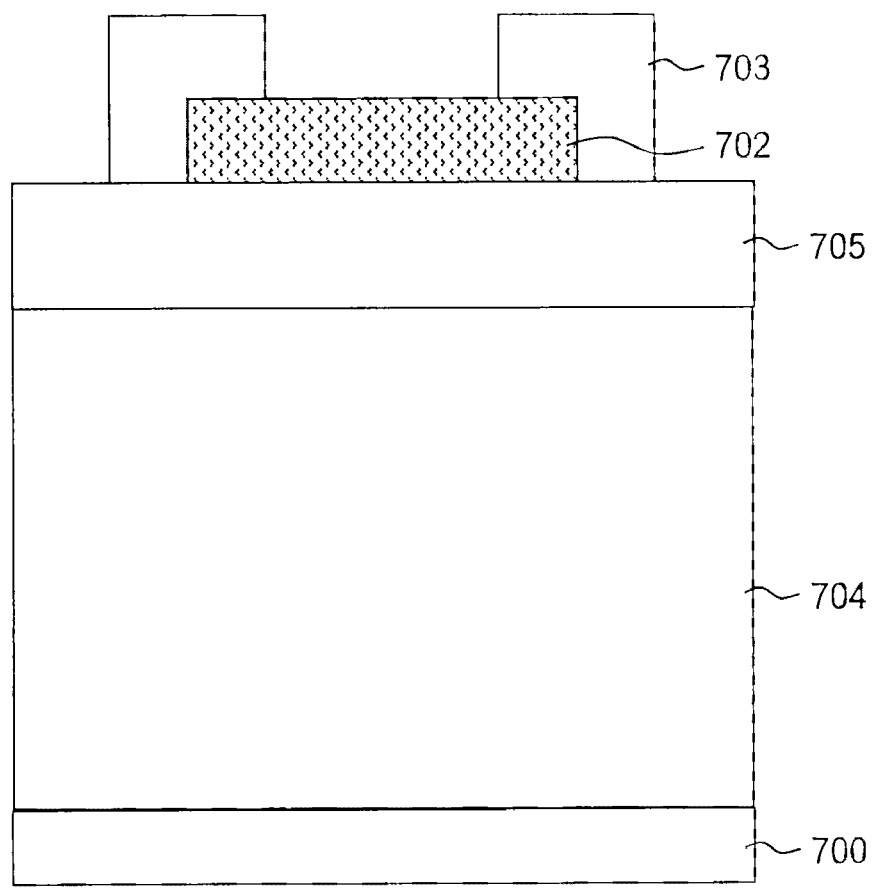
FIG. 5 is a descriptive diagram illustrating another example of the metal resistor.

FIG. 5 is a descriptive diagram illustrating another example of the metal resistor. As illustrated in FIG. 5, a semiconductor layer 704 is epitaxially grown on the semiconductor substrate 700 by MOCVD or MBE and an interlayer oxide film (made of $SiO_2$ or the like) 705 is formed on the semiconductor layer 704. Then, the metal layer 702 and the electrodes 703 are sequentially formed on the interlayer oxide film 705. As in the example in FIG. 4, the metal resistor includes the metal layer 702 as the main resistance component and has the negative temperature characteristics.

In the antenna switch 1, the channel resistor or the $n^+$ resistor having the positive temperature characteristics is preferably used for the resistor Ra1 and the metal resistor having the negative temperature characteristics is preferably used for the resistor Ra2. This allows the temperature fluctuation in the resistance value of the resistor circuit Ra to be reduced. Although either of the channel resistor and the $n^+$ resistor may be used for the resistor Ra1, the channel resistor is advantageously used in characteristics.

Figure 6:
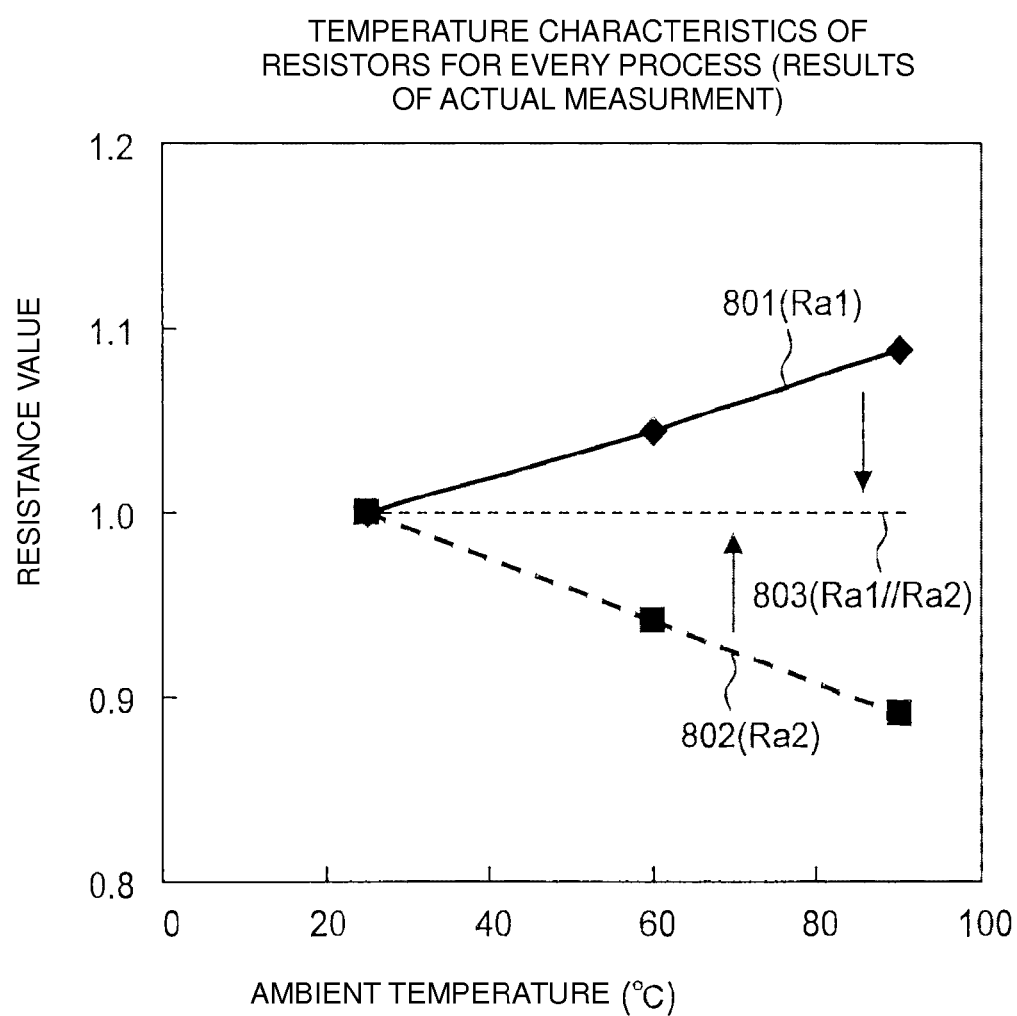
FIG. 6 is a descriptive diagram illustrating exemplary temperature characteristics of the channel resistor and the metal resistor.

FIG. 6 is a descriptive diagram illustrating exemplary temperature characteristics of the channel resistor and the metal resistor. The diagram in FIG. 6 indicates that, with respect to the resistance value at normal temperature (e.g., about 25° C.) which is a reference value ("1.0"), the ratios of the resistance values at the other temperatures. Referring to FIG. 6, reference numeral 801 denotes the temperature characteristic of the channel resistor and reference numeral 802 denotes the temperature characteristic of the metal resistor. Reference numeral 803 denotes the temperature characteristic of a combined resistance of the channel resistor and the metal resistor. The absolute value of the temperature coefficient of the channel resistor preferably has the same or substantially the same value as that of the temperature coefficient of the metal resistor made of, for example, WSiN or Ta—$SiO_2$, as illustrated in FIG. 6. Accordingly, the use of the channel resistor for the resistor Ra1 allows the temperature fluctuation in the resistance value of the resistor circuit Ra (the resistance value of the combined resistance of the resistor Ra1 and the resistor Ra2) to be further reduced, compared with the case in which the $n^+$ resistor is used for the resistor Ra1.

Since the absolute value of the temperature coefficient of the channel resistor preferably has the same or substantially the same value as that of the temperature coefficient of the metal resistor, the resistor Ra1 and the resistor Ra2 preferably have the same or substantially the same resistance value. Since the resistance value per unit area of the channel resistor is equal to several hundred ohms and the resistance value per unit area of the metal resistor is equal to several kilo-ohms, the resistor Ra1 (the channel resistor) is required to have a length about ten times greater than that of the resistor Ra2 (the metal resistor) at the same width and the resistor Ra2 is required to have a width about ten times greater than that of the resistor Ra1 at the same length in order to provide the resistor Ra1 and the resistor Ra2 having the same resistance value.

Figure 7:
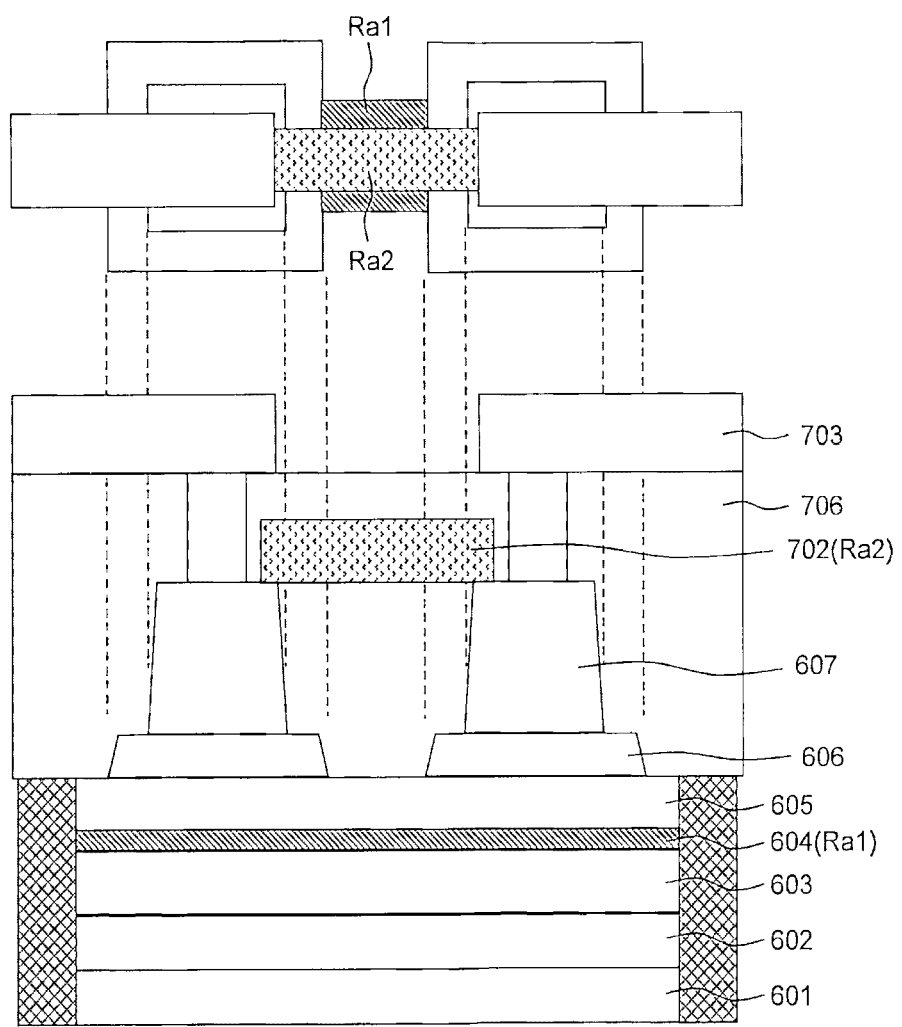
FIG. 7 is a descriptive diagram illustrating an exemplary method of forming resistors.

Although the resistor circuit Ra may be realized by separately laying out the resistors Ra1 and Ra2 side by side on the semiconductor substrate and connecting the respective electrodes in parallel to each other, as illustrated in FIG. 2 to FIG. 5, the resistors Ra1 and Ra2 may be vertically stacked on the semiconductor substrate. FIG. 7 illustrates an exemplary method of forming the resistors Ra1 and Ra2.

As illustrated in FIG. 7, the channel resistor is preferably formed by sequential epitaxial growth as in the manner illustrated in FIG. 2 and the channel resistor is used as the resistor Ra1. Then, the metal layer 702 is provided between the electrodes 607 at both ends of the channel resistor and the metal layer 702 is used as the resistor Ra2. An interlayer insulating layer 706 that insulates the semiconductor layers is provided between the metal resistor and the channel resistor. Vertically stacking the resistor Ra1 and the resistor Ra2 on the semiconductor substrate in the above manner allows the chip area to be reduced, compared with the case in which the resistor Ra1 and the resistor Ra2 are laid out side by side.

Figure 8A:
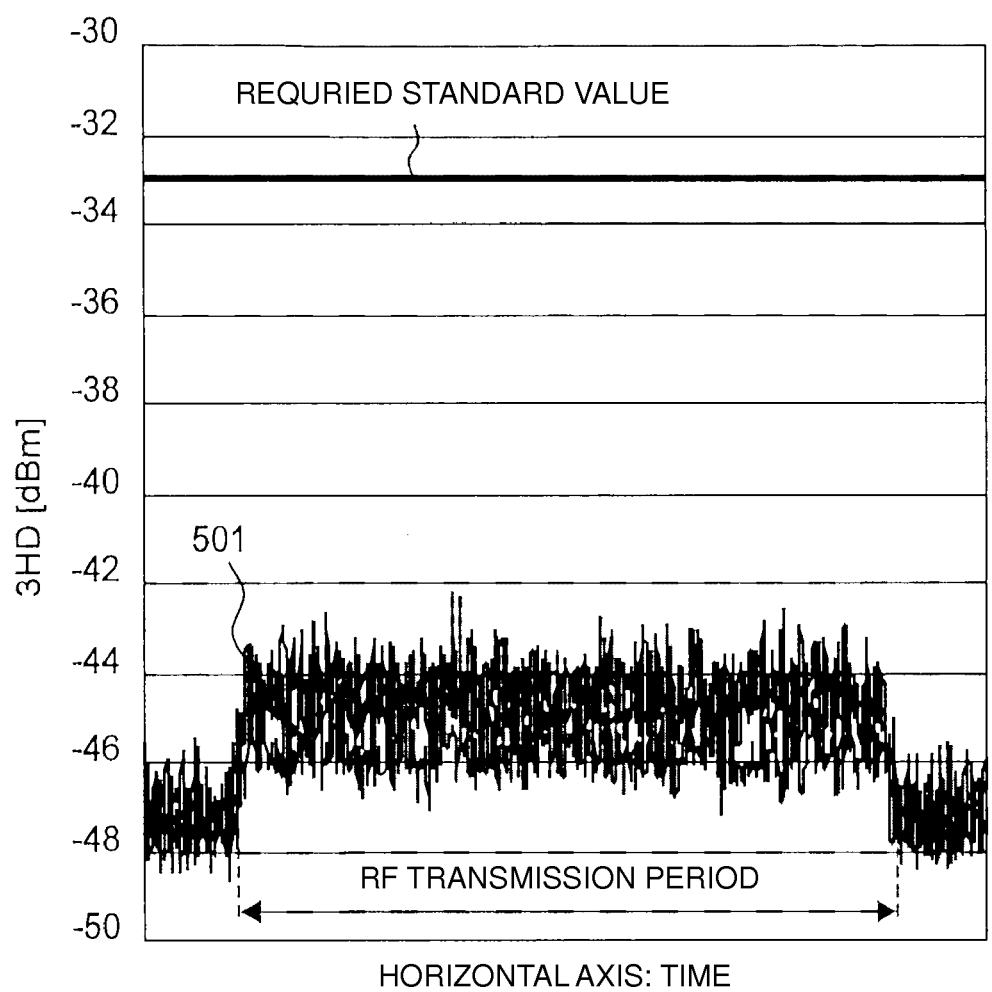
FIG. 8A is a descriptive diagram illustrating an example of harmonic characteristics of an RF transmission signal in an antenna switch in which a resistor circuit includes only resistors having positive temperature characteristics.
Figure 8B:
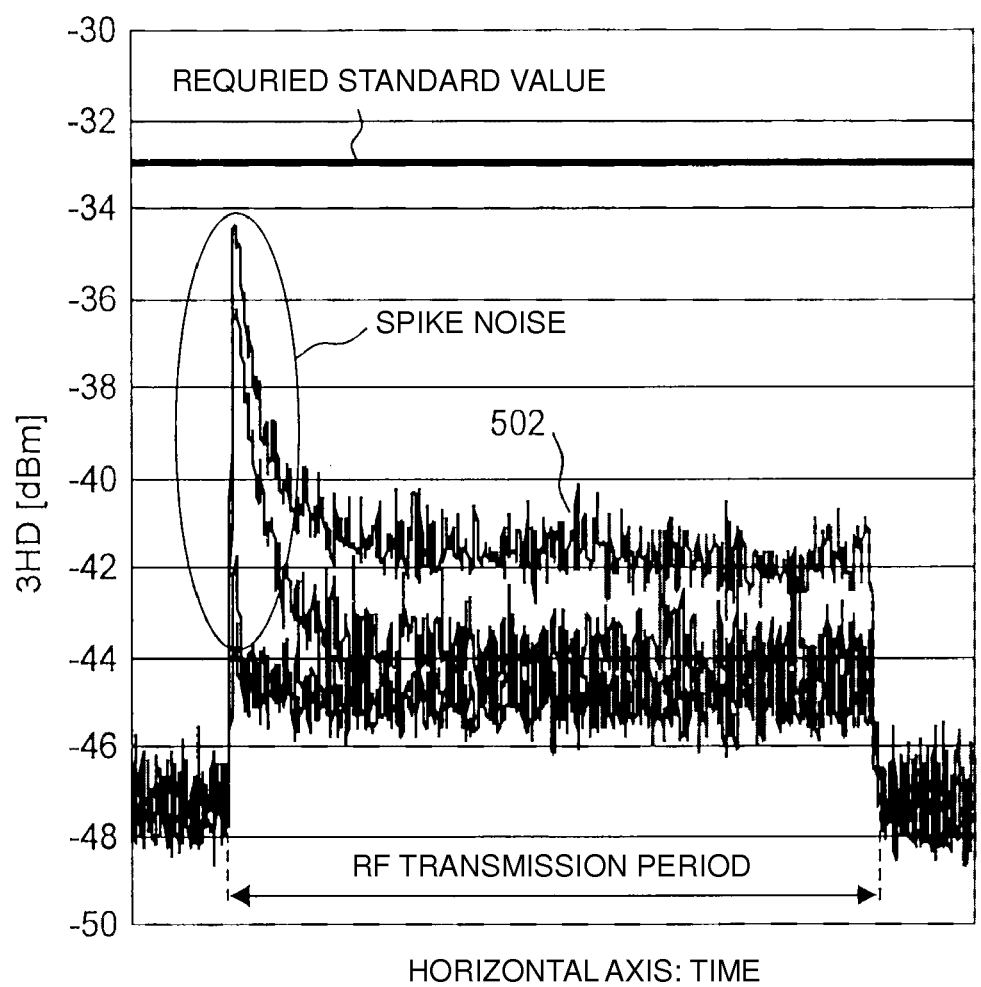
FIG. 8B is a descriptive diagram illustrating another example of the harmonic characteristics of the RF transmission signal in the antenna switch in which the resistor circuit includes only resistors having positive temperature characteristics.

FIG. 8A and FIG. 8B are descriptive diagrams illustrating examples of harmonic characteristics of the RF transmission signal in an antenna switch in which the resistor circuit Ra includes only resistors having the positive temperature characteristics. FIG. 8A illustrates the characteristics of harmonic distortion of the RF transmission signal when the antenna switch is switched from a reception mode to the transmission mode at normal temperature (Ta=25° C.). FIG. 8B illustrates the characteristics of the harmonic distortion of the RF transmission signal when the antenna switch is switched from the reception mode to the transmission mode at a high temperature (Ta=90° C.)

As illustrated by reference numeral 501 in FIG. 8A, the harmonic distortion of the RF transmission signal at normal temperature is sufficiently low for a required standard value. In contrast, as illustrated by reference numeral 502 in FIG. 8B, spike noise occurs when the RF transmission signal rises at the high temperature and it is understood that the degree of margin of the harmonic distortion of the RF transmission signal for the required standard value is reduced. As described above, the deterioration of the characteristics at high temperature is caused by the fact that the FET of the high-frequency switch SW1 is not in a sufficient reverse bias state when the RF transmission signal rises and the RF transmission signal leaks into the reception terminal Rx side.

Figure 9:
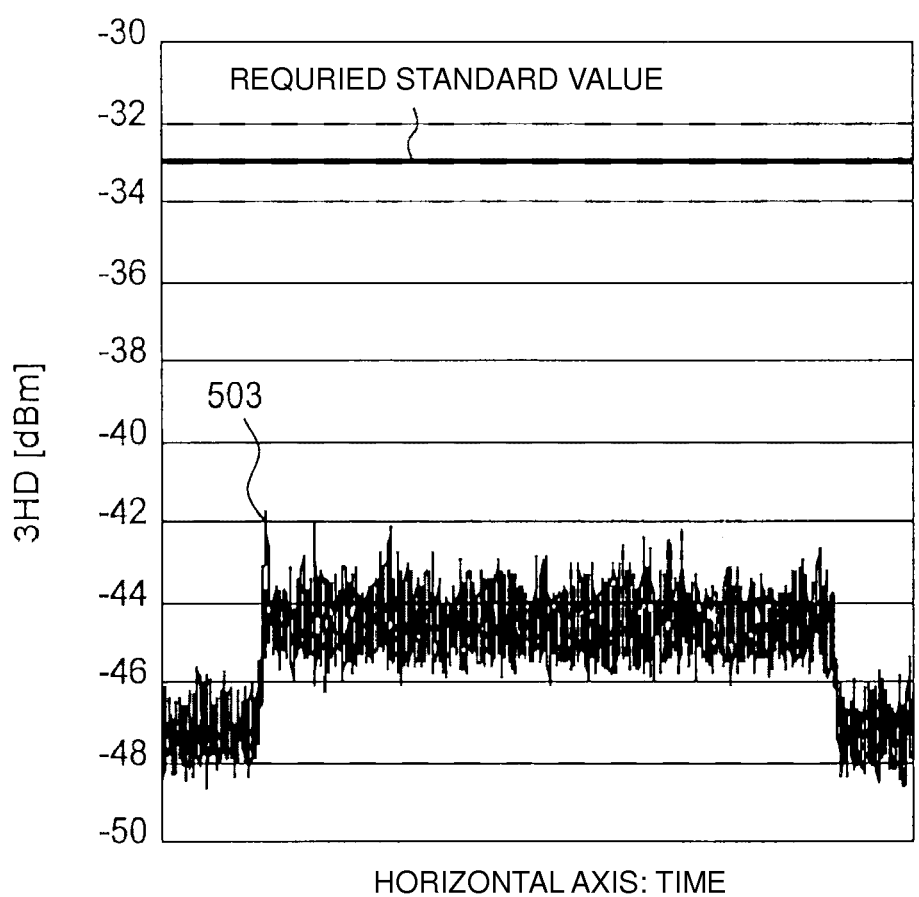
FIG. 9 is a descriptive diagram illustrating an example of the harmonic characteristics of the RF transmission signal in the antenna switch according to the first preferred embodiment of the present invention.

FIG. 9 is a descriptive diagram illustrating an example of the harmonic characteristics of the RF transmission signal in the antenna switch 1 according to the first preferred embodiment. The characteristics of the harmonic distortion of the RF transmission signal when the antenna switch 1 is switched from the reception mode to the transmission mode at the high temperature (Ta=90° C.) are illustrated in FIG. 9.

In the antenna switch 1, as illustrated by reference numeral 503 in FIG. 9, no spike noise occurs when the RF transmission signal rises also at the high temperature. This is because the use of the resistor Ra1 having the positive temperature characteristics and the resistor Ra2 having the negative temperature characteristics in the resistor circuit Ra significantly reduces or prevents the temperature fluctuation in the resistance value of the entire resistor circuit Ra to significantly reduce or prevent the temperature fluctuation in the charging time of the capacitor C2. In other words, with the antenna switch 1, the determination of an optimal charging time before the field effect transistors M1 and M2 at the reception side are in the sufficient reverse bias state at normal temperature causes the charging time not to be greatly varied depending on the temperature. Accordingly, it is possible to prevent the leakage path from being formed at the reception terminal Rx side even at high temperature and at low temperature to prevent the deterioration in the characteristics of the harmonic distortion. This allows the antenna switch having excellent distortion characteristics to be provided to reduce the load of the distortion characteristics on components other than the antenna switch in the distortion characteristics of the entire system, such as a cellular phone, which performs wireless communication.

Second Preferred Embodiment

Figure 10:
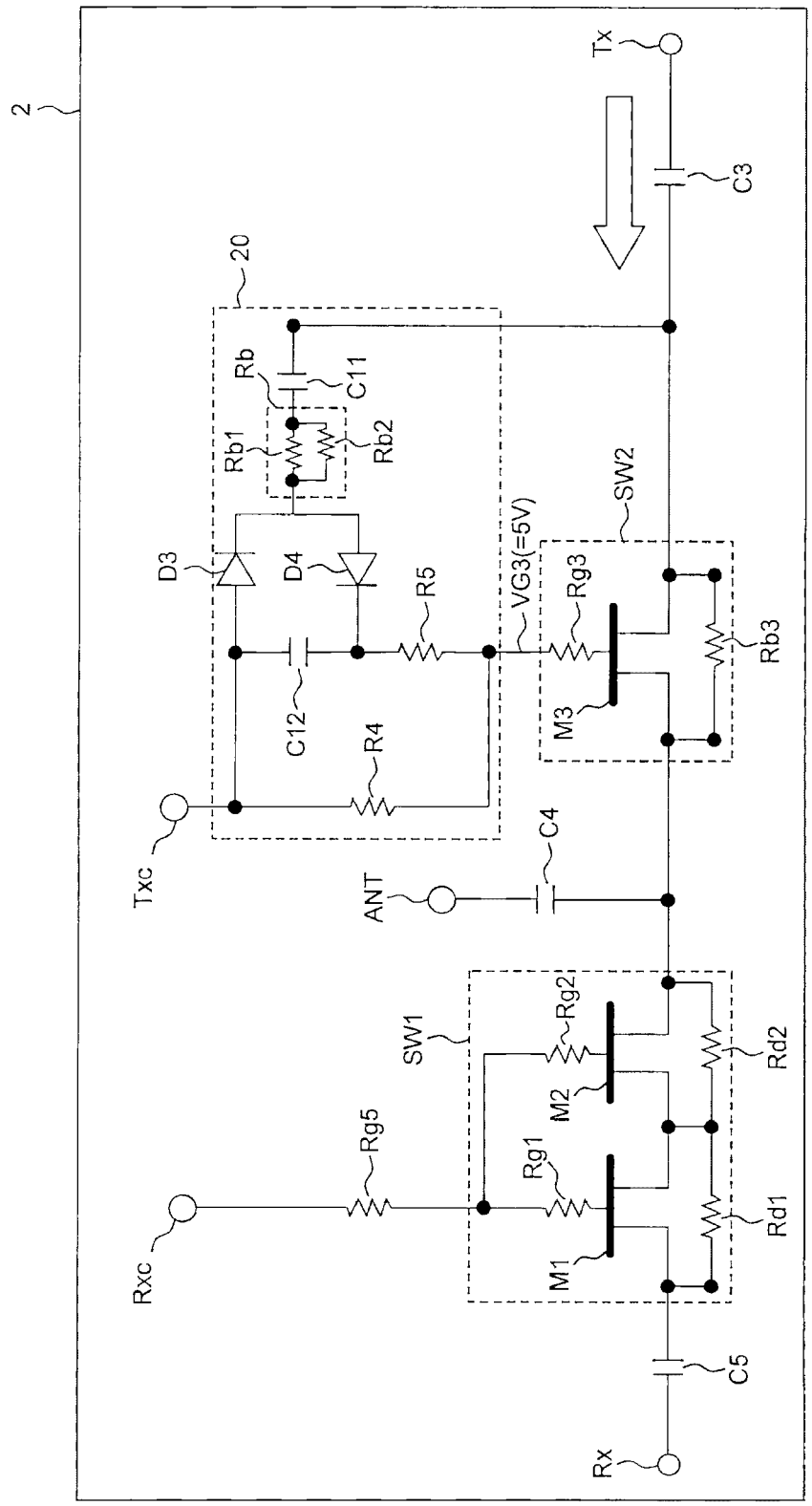
FIG. 10 is a circuit diagram illustrating the configuration of an antenna switch according to a second preferred embodiment of the present invention.

FIG. 10 is a circuit diagram illustrating the configuration of an antenna switch according to a second preferred embodiment of the present invention.

Referring to FIG. 10, an antenna switch 2 is a SPDT antenna switch and establishes a signal path of the RF signals in, for example, the GSM mode between the transmission side and the reception side. The antenna switch 2 is provided on one compound semiconductor substrate that is made of GaAs or the like and that has high electron mobility although not specifically restricted. Specifically, the antenna switch 2 includes the reception-side high-frequency switch SW1, the transmission-side high-frequency switch SW2, and a voltage generating circuit 20. The same reference numerals and letters are used in FIG. 10 to identify the same circuit components in the antenna switch 1 according to the first preferred embodiment. A detailed description of such circuit components is omitted herein.

The gates of the field effect transistors M1 and M2 in the reception-side high-frequency switch SW1 are driven in response to the control voltage V_Rxc supplied to the control terminal Rxc. The gate of the field effect transistor M3 in the transmission-side high-frequency switch SW2 is driven in response to the voltage generated by the voltage generating circuit 20.

The voltage generating circuit 20 is a voltage step-up circuit that generates positive voltage on the basis of the RF transmission signal to be supplied to the transmission terminal Tx and the control voltage V_Txc supplied to the control terminal Txc to supply the positive voltage to the transmission-side high-frequency switch SW2. Specifically, the voltage generating circuit 20 includes capacitors C11 and C12, diodes D3 and D4, a resistor circuit Rb, and resistors R4 and R5. The following connection relationship is established between the capacitors C11 and C12, the diodes D3 and D4, the resistor circuit Rb, and the resistors R4 and R5. One end of the capacitor C11 is connected to a node to which the drain of the field effect transistor M3 and the capacitor C3 are connected and the other end thereof is connected to the resistor circuit Rb. The resistor circuit Rb is a circuit in which, for example, a resistor Rb1 and a resistor Rb2 are connected in parallel to each other. One end of the resistor circuit Rb is connected to the capacitor C11 and the other end thereof is connected to an anode of the diode D4 and a cathode of the diode D3. An anode of the diode D3 is connected to one end of the capacitor C12 and the control terminal Txc. A cathode of the diode D4 is connected to the other end of the capacitor C12 and one end of the resistor R5. The other end of the resistor R5 is connected to the gate of the field effect transistor M3 via the gate resistor Rg3. One end of the resistor R4 is connected to the control terminal Txc and the other end thereof is connected to the other end of the resistor R5.

Specifically, the voltage generating circuit 20 operates in the following manner. A case will now be considered in which, for example, 0 V is supplied to the control terminal Rxc as the control voltage V_Rxc and, for example, 3 V is supplied to the control terminal Txc as the control voltage V_Txc. In this case, 3 V is supplied to the gate of the field effect transistor M3 in the transmission-side high-frequency switch SW2 via the resistor R4 and the gate resistor Rg3. This causes the gate and the source of the field effect transistor M3 to be forward biased to cause the field effect transistor M3 to be in the on state. The source voltage (the voltage at the antenna terminal side) Vant of the field effect transistor M3 is increased in accordance with the gate voltage to have a value of, for example, about 2.5 V. In addition, 0 V is applied to the gates of the field effect transistors M1 and M2 at the reception side. Since this causes the gate and the source of each of the field effect transistors M1 and M2 to be in the reverse bias state (Vgs=−2.5 V), the field effect transistors M1 and M2 are in the off state. Upon supply of the RF transmission signal to the transmission terminal Tx in this state, the RF transmission signal is propagated to the antenna terminal ANT via the high-frequency switch SW2 and a portion of the RF transmission signal is supplied to the voltage generating circuit 20. For example, when the voltage width/height of the RF transmission signal is lower than the control voltage V_Txc, the diode D4 is reverse-biased to be in the non-conductive state and the diode D3 is forward-biased to be in the conductive state. As a result, current flows from the control terminal Txc into the transmission terminal Tx side through the diode D3, the resistor circuit Rb, and the capacitor C11. At this time, positive electric charge is accumulated in an electrode at the resistor circuit Rb side of the capacitor C11. When the voltage width/height of the RF transmission signal is higher than the control voltage V_Txc, the diode D3 is reverse-biased to be in the non-conductive state and the diode D4 is forward-biased to be in the conductive state. As a result, current flows from the transmission terminal Tx side into the control terminal Txc through the capacitor C11, the resistor circuit Rb, the diode D4, and the capacitor C12. At this time, the positive electric charge accumulated in the electrode at the resistor circuit Rb side of the capacitor C11 is moved to and accumulated in an electrode at the diode D4 side of the capacitor C12. The movement of the electric charge between the capacitor C11 and the capacitor C12 by using the alternate switching of the polarity of the RF transmission signal with respect to the control voltage V_Txc (=3 V) in the above manner causes voltage (for example, 5 V) to be charged between both terminals of the capacitor C12. The voltage has positive polarity at the electrode at the diode D4 side. This positive voltage is supplied as a gate voltage VG3 of the field effect transistor M3 at the transmission side to cause a deeper forward bias state between the gate and the source of the field effect transistor M3, so as to reduce the insertion loss of the switch at the transmission side. In addition, the increase in the gate voltage of the field effect transistor M3 increase the voltage at the source side of the field effect transistor M3 to have a value of, for example, about 4.5 V. Since this increases the source voltages of the field effect transistors M1 and M2 to cause the gates and the sources of the field effect transistors M1 and M2 at the reception side to be in a deep reverse bias state (Vgs=−4.5 V), so as to improve the isolation characteristics of the reception-side high-frequency switch SW1.

As in the resistor circuit Ra in the voltage generating circuit 10 described above, the temperature dependence of the resistor circuit Rb affects the charging time of the capacitor C12. Accordingly, high temperature dependence of the resistor circuit Rb lengthens the time to increase the gate voltage and the source voltage of the field effect transistor M3 at the transmission side at high temperature or at low temperature, compared with the time at normal temperature, and also lengthens the time required for the field effect transistors M1 and M2 at the reception side to be in the sufficient reverse bias state. Accordingly, in the antenna switch 2 according to the second preferred embodiment, the channel resistor or the $n^+$ resistor having the positive temperature characteristics is used for the resistor Rb1 in the resistor circuit Rb and the metal resistor having the negative temperature characteristics is used for the resistor Rb2 in the resistor circuit Rb, as in the resistor circuit Ra in the antenna switch 1. This allows the temperature fluctuation in the resistance value in the entire resistor circuit Rb to be reduced. In addition, in order to further reduce or prevent the temperature fluctuation, the resistor Rb1 has, for example, the same resistance value as that of the resistor Rb2. Although either of the channel resistor and the $n^+$ resistor may be used for the resistor Rb1, the channel resistor is advantageously used in characteristics for the same reason described above.

As described above, with the antenna switch 2 according to the second preferred embodiment, the determination of an appropriate charging time of the capacitor C12 before the field effect transistor M3 at the transmission side are in the sufficient forward bias state at normal temperature causes the charging time not to be greatly varied depending on the temperature. Accordingly, it is possible to prevent the leakage path from being formed at the reception terminal Rx side even at high temperature or at low temperature to prevent the deterioration in the characteristics of the harmonic distortion, as in the antenna switch 1. In addition, it is possible to reduce the load of the distortion characteristics on components other than the antenna switch in the distortion characteristics of the entire system that performs the wireless communication, as in the first preferred embodiment.

Although, for example, the parallel connection of the resistors Ra1 and Ra2 are exemplified as the resistor circuit Ra, the resistor circuit Ra is not limited to this. It is sufficient to combine a resistor having the positive temperature characteristics with a resistor having the negative temperature characteristics so that the temperature fluctuation of the resistance value of the entire resistor circuit Ra is reduced. For example, series connection of the resistors Ra1 and Ra2 may be used as the resistor circuit Ra. The same applies to the resistor circuit Rb.

Although the case is exemplified in the first preferred embodiment in which the resistor circuit Ra having small temperature fluctuation is applied to the antenna switch 1 including the voltage generating circuit 10 that generates the gate voltage of the field effect transistors M1 and M2 at the reception side and the case is exemplified in the second preferred embodiment in which the resistor circuit Rb having small temperature fluctuation is applied to the antenna switch 2 including the voltage generating circuit 20 that generates the gate voltage of the field effect transistor M3 at the transmission side, the applications of the resistor circuit Ra and the resistor circuit Rb are not limited to the above ones. For example, the resistor circuits Ra and Rb may be applied to antenna switches each including the voltage generating circuit 10 and the voltage generating circuit 20.

Although the voltage generating circuit 10 generates the gate drive voltage of the field effect transistors M1 and M2 at the reception side by using a portion of the RF transmission signal in the signal transmission, the voltage generating circuit 10 is not limited to the above one. For example, when the signal level of the RF reception signal input into the reception terminal Rx is high, the gate drive voltage of the field effect transistor M3 at the transmission side may be generated by using a portion of the RF reception signal in the signal reception. Similarly, the voltage generating circuit 20 may generate the gate drive voltage of the field effect transistors M1 and M2 at the reception side by using a portion of the RF reception signal in the signal reception.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A semiconductor apparatus comprising:
an antenna terminal arranged to be connected to an antenna;
a plurality of external terminals through which RF signals are capable of being supplied;
a plurality of field effect transistors provided between the antenna terminal and the respective external terminals;
a control terminal through which a control signal to control turning on and off of each of the plurality of field effect transistors is received;
a voltage generating unit configured to generate a gate drive voltage of one of the plurality of field effect transistors provided between one of the plurality of external terminals and the antenna terminal;
a capacitor; and
a resistor circuit; wherein
when the one of the plurality of field effect transistors provided between the one of the plurality of external terminals and the antenna terminal is turned off, the voltage generating unit charges the capacitor via the resistor circuit by switching a polarity of the RF signal to be supplied to another one of the plurality of external terminals with respect to the control signal and outputs a voltage based on a sum of a charge voltage and a voltage of the control signal as the gate drive voltage; and
the resistor circuit includes a first resistor including positive temperature characteristics and a second resistor including negative temperature characteristics.

2. The semiconductor apparatus according to claim 1, wherein
the first resistor includes a semiconductor layer located on a semiconductor substrate; and
the second resistor includes a metal layer.

3. The semiconductor apparatus according to claim 2, wherein the first resistor is arranged to vertically oppose the second resistor with an insulating layer sandwiched between the first resistor and the second resistor.

4. The semiconductor apparatus according to claim 2, wherein
the semiconductor substrate is made of a compound semiconductor;
the semiconductor layer located on the semiconductor substrate is a channel layer; and
the metal layer is made of WSiN or Ta—SiO$_2$.

5. The semiconductor apparatus according to claim 1, wherein the one of the plurality of external terminals is a reception terminal through which the RF signals are received and the other of the plurality of external terminals is a transmission terminal through which the RF signals are transmitted.

6. The semiconductor apparatus according to claim 1, wherein the first resistor is a channel resistor or an n$^+$ resistor, and the first and second resistors have an equal or substantially equal resistance value.

7. The semiconductor apparatus according to claim 1, wherein the first resistor and the second resistor are connected to each other in parallel or in series.

8. A semiconductor apparatus comprising:
an antenna terminal arranged to be connected to an antenna;
a plurality of external terminals through which RF signals are capable of being supplied;
a plurality of field effect transistors provided between the antenna terminal and the respective external terminals;
a control terminal through which a control signal to control turning on and off of each of the plurality of field effect transistors is received; and
a voltage generating unit configured to generate a gate drive voltage of one of the plurality of field effect transistors provided between one of the plurality of external terminals and the antenna terminal;
a capacitor; and
a resistor circuit; wherein
when one of the plurality of field effect transistors provided between the one of the plurality of external terminals and the antenna terminal is turned on, the voltage generating unit charges the capacitor via the resistor circuit by switching a polarity of the RF signal to be supplied to the one of the plurality of external terminals with respect to the control signal and outputs a voltage based on a sum of a charge voltage and a voltage of the control signal as the gate drive voltage; and
the resistor circuit includes a first resistor including positive temperature characteristics and a second resistor including negative temperature characteristics.

9. The semiconductor apparatus according to claim 8, wherein
the first resistor includes a semiconductor layer located on a semiconductor substrate; and
the second resistor includes a metal layer.

10. The semiconductor apparatus according to claim 9, wherein the first resistor is arranged to vertically oppose the second resistor with an insulating layer sandwiched between the first resistor and the second resistor.

11. The semiconductor apparatus according to claim 9, wherein
the semiconductor substrate is made of a compound semiconductor;
the semiconductor layer located on the semiconductor substrate is a channel layer; and
the metal layer is made of WSiN or Ta—SiO$_2$.

12. The semiconductor apparatus according to claim 8, wherein the one of the plurality of external terminals is a transmission terminal through which the RF signals are transmitted.

13. The semiconductor apparatus according to claim 8, wherein the first resistor is a channel resistor or an n$^+$ resistor, and the first and second resistors have an equal or substantially equal resistance value.

14. The semiconductor apparatus according to claim 8, wherein the first resistor and the second resistor are connected to each other in parallel or in series.

15. A semiconductor apparatus comprising:
an antenna terminal arranged to be connected to an antenna;
a plurality of external terminals through which RF signals are capable of being supplied;
a plurality of field effect transistors provided between the antenna terminal and the respective external terminals;
a control terminal through which a control signal to control turning on and off of each of the field effect transistors is received;
a voltage generating unit configured to generate a gate drive voltage of one of the plurality of field effect transistors provided between one of the plurality of external terminals and the antenna terminal;
a capacitor; and
a resistor circuit; wherein
the voltage generating unit charges the capacitor via the resistor circuit by switching a polarity of a transmission signal to be supplied to a source or a drain of one of the plurality of field effect transistors that is in an on state with respect to the control signal and outputs a voltage based on a sum of a charge voltage and a voltage of the control signal as the gate drive voltage; and the resistor circuit includes a first resistor including positive temperature characteristics and a second resistor including negative temperature characteristics.

16. The semiconductor apparatus according to claim 15, wherein the one of the plurality of external terminals is a reception terminal through which a reception signal is capable of being supplied.

17. The semiconductor apparatus according to claim 15, wherein the one of the plurality of external terminals is a transmission terminal through which a transmission signal is capable of being supplied.

18. The semiconductor apparatus according to claim 15, wherein the first resistor is a channel resistor or an $n^+$ resistor, and the first and second resistors have an equal or substantially equal resistance value.

19. The semiconductor apparatus according to claim 15, wherein the first resistor and the second resistor are connected to each other in parallel or in series.

* * * * *